United States Patent

Pessina

Patent Number: 5,136,218
Date of Patent: Aug. 4, 1992

[54] METHOD AND DEVICE FOR MONITORING A RAILWAY TRACTION SYSTEM WITH INDIVIDUALLY-DRIVEN INDEPENDENT WHEELS

[75] Inventor: Gaetano Pessina, Turin, Italy

[73] Assignee: FI.RE. MA. System S.p.A., Italy

[21] Appl. No.: 667,518

[22] Filed: Mar. 11, 1991

[30] Foreign Application Priority Data

Mar. 12, 1990 [IT] Italy .................. 19655 A/90

[51] Int. Cl.$^5$ ............................ H02P 5/46
[52] U.S. Cl. ...................... 318/139; 105/73; 318/434
[58] Field of Search ............ 105/73, 76; 318/52, 318/71, 77, 139, 434

[56] References Cited

U.S. PATENT DOCUMENTS

| | | | |
|---|---|---|---|
| 3,955,130 | 5/1976 | Graf | 318/434 |
| 4,134,048 | 1/1979 | Schneider | 318/52 |
| 4,290,000 | 9/1981 | Sun | 318/434 |
| 4,392,091 | 7/1983 | Roberts et al. | 318/52 |
| 4,680,512 | 7/1987 | Melocik | 318/434 |
| 4,686,434 | 8/1987 | Kojima et al. | 318/77 |

Primary Examiner—Robert J. Oberleitner
Assistant Examiner—Kevin D. Rutherford
Attorney, Agent, or Firm—Shlesinger, Fitzsimmons & Shlesinger

[57] ABSTRACT

A method and a device for monitoring the drive motors for each pair of coaxial wheels of a railway traction system, including cyclically measuring representative quantities of the mechanical torque temporarily developed by the motors, comparing such quantities, and disconnecting both motors from the electric power supply whenever the result of the comparison shows a difference greater than a previously established value. Disclosed also is a method of cyclically memorizing the temporary value of a parameter of each motor, commanding a variation of such parameter by a small pre-established quantity, calculating the value that such controlled parameter should reach as a result of such variation, comparing the result of the calculation with the effective value reached, and disconnecting the power supply to the motor whenever the result of such comparison is not equal to or less than a pre-established quantity.

16 Claims, 3 Drawing Sheets

METHOD AND DEVICE FOR MONITORING A RAILWAY TRACTION SYSTEM WITH INDIVIDUALLY-DRIVEN INDEPENDENT WHEELS

In the field of rail transportation, vehicles have been proposed in which the wheels on either side are not interconnected by axles, each pair of opposing driving wheels being provided with two motors, one for each wheel, so as to eliminate the need for coupling axles between opposing pairs of wheels on either side of the vehicle, resulting in obvious advantages including the possibility of lowering the floor of the vehicle and reducing its main section, thereby making it possible, for example, to limit the amount of excavation when digging tunnels and in general making dimensional restrictions more flexible during planning. One of the problems in this kind of vehicle with independently driven wheels is controlling the plurality of motors, so that each one plays its part in correctly carrying out the required functions within the system so as to prevent any failures from giving rise to unsafe conditions.

In fact, a traction system with independent motor drives is characterized by a danger unknown to conventional type systems, that is to say, with pairs of driving wheels connected to a drive shaft. In the case of the conventional system, it is obviously not possible for two wheels mechanically connected by the same axle to generate derailing torques with respect to the axis of rotation of the bogie on which they are fitted, that is to say, torques which cause the bogie to deviate from the path set by the rails. In the case of fully independent wheels, each having its own motor, the operating conditions can only be considered substantially identical to the conventional case when they are perfectly regular, that is to say whenever it is possible to maintain the torque transmitted by two opposing driving wheels within reasonably equal limits. In the event of deteriorated operation, in other words, in the event of one, or worse still, several mechanisms going out of order on the same side of bogie, a derailing torque is generated which exerts stress with respect to the axis of rotation of the bogie counteracted exclusively by the lateral flanges of the wheels on the lateral surface of the rails. While this action of the flanges is suitable for driving vehicles under normal conditions, that is, with a zero torque on the axis of rotation of the bogie, it is certainly not suitable when derailing torques deriving from the tractive efforts or braking of the wheels are applied under asymmetrical working conditions. An abnormal situation of this kind is obviously unacceptable and no traction system in which there is a possibility of this situation occurring can be put to practical use.

Let us suppose, for example, that a total or partial failure has occurred in the controlled electric power supply system of a motor or in the motor itself (for example a break in one of the motor windings) causing it to run free, driven by the movement of the vehicle. This situation of unbalanced traction on the two sides of the vehicle immediately gives rise to a derailing torque of an extent directly proportional, within the limits of adherence, to the stresses applied by the wheel-rail system. The same occurs when a failure in the power supply device of a motor causes it to run at an uncontrolled speed, for example, top speed.

In this latter case, the situation can be even more dangerous. Let us suppose that the vehicle is moving at a constant speed close to maximum and that it does so for a certain period of time. A failure, of the type mentioned previously, which causes uncontrolled rotation at maximum speed, therefore remains unnoticed, since the speed of such motor remains similar to that of the others, still under control. Now let us go on, for example, to imagine a braking period, worse still, with a maximum braking torque: all the motors instantly slow down except the one running at an uncontrolled speed. In this situation, the derailing torques generated are twice as strong as those generated by a failure causing one motor to run free, since the derailing torque is determined by a maximum tractive and a maximum braking effort. Fracture of the mechanical parts reacting against the derailing torque, and in particular the system composed of the wheel flanges and the railheads, is in this case highly probable, with the result that the vehicle will unavoidably run off the rails.

The general scope of this invention is to obviate the aforementioned problems by providing a railway traction system with independently driven wheels on either side of the vehicle, comprising a highly reliable monitoring system which makes it possible to maintain constant safety conditions, without danger of derailment, by returning the specific mechanical stresses within the limits of conventional systems even in the event of failure of the individual motors and their accessory circuits. This scope is achieved according to the invention by providing a method for monitoring a railway vehicle traction system comprising monitoring means controlled by a manual or automatic drive system controlling and coordinating a plurality of individually driven wheels disposed in opposing coaxial pairs on either side of the vehicle, characterized by the fact of comprising, for each pair of coaxial wheels of said plurality, the steps of cyclically measuring, for each motor of the pair, a representative quantity of the mechanical torque developed by it at that moment, comparing the representative quantities thus measured for the two motors of each coaxial pair of wheels, disconnecting both motors from the electric power supply whenever the result of the comparison shows a difference greater than a previously established value. The method advantageously also comprises, for each motor, the further steps of cyclically memorizing the temporary value of a parameter of the motor, controlled by the monitoring means, commanding a variation of such parameter by a small pre-established quantity, calculating the value that such controlled parameter should reach as a result of such variation, comparing the result of the calculation with the effective value reached and switching off the power supply to the motor whenever the result of such comparison is not equal to or less than a pre-established quantity.

The application of this method is achieved, according to the innovatory principles of this invention, by providing a railway vehicle traction system comprising monitoring means controlled by a manual or automatic drive system controlling and coordinating a plurality of individually driven wheels disposed in opposing coaxial pairs on either side of the vehicle, characterized by the fact of comprising in combination, for each pair of coaxial wheels of said plurality, means for measuring, for each motor of the pair, a representative quantity of the mechanical torque developed by the motor at that moment, first means for comparing the representative quantities measured by the measuring means for the two motors of each coaxial pair of wheels, said first comparing means controlling switching means for switching off the power supply to both motors whenever the result of the comparison shows a difference greater than a previously established value. The system is also advantageously characterized by the fact of comprising in combination, for each motor, activated in cyclic sequence, sensors for detecting a temporary value of a parameter of the motor, controlled by the means monitoring the motors, means for memorizing the value measured by said sensors, means for automatically commanding the variation of such parameter by a small pre-established quantity, means for calculating the value that said controlled parameter should reach as a result of such variation, second means for comparing the result of the calculation with the effective value reached and measured again by the sensors, said second comparing means commanding switching means for switching off the power supply to the motor whenever the result of the comparison is not equal to or less than a pre-established quantity.

The innovatory principles of this invention and its advantages with respect to the known technique will be more clearly evident from the following desciption of a possible exemplificative embodiment applying such principles, with reference to the accompanying drawings, in which.

Figure 1:
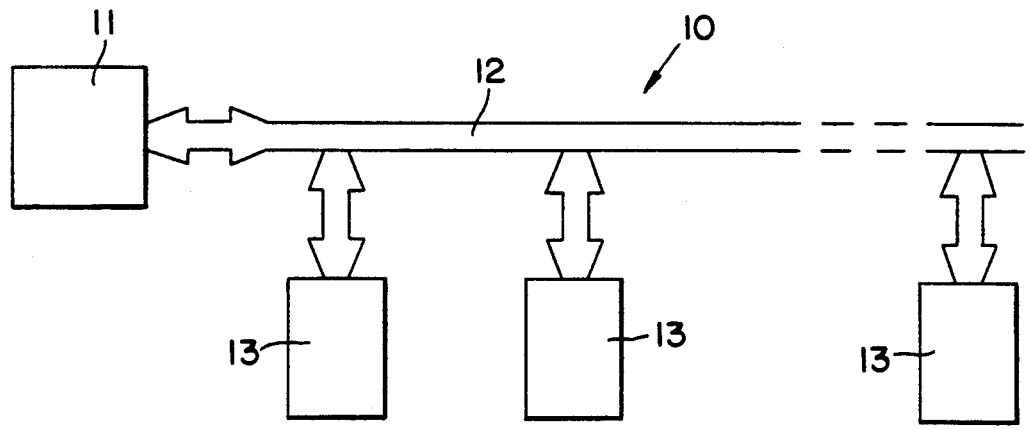
FIG. 1 shows a general block diagram of a traction system made according to the innovatory principles of this invention.

With reference to the figures, as shown schematically in FIG. 1, a monitoring system, generically indicated by reference 10, comprises, according to the invention, a general monitoring system 11 connected, by means of signal communicating lines 12, to actuating devices 13 for each individually driven wheel (obviously even in number since they are disposed in opposing pairs on either side of the vehicle).

The general monitoring device 11, achieved for example by means of a microprocessor device suitably programmed to operate according to the innovatory principles of the invention as described further on, is adapted to monitor each individual actuating device 13, in traction or in braking, in order to implement the controls of the driver or of an automatic driving system of known technique used to drive the vehicle. Moreover, it carries out the innovatory function, as described further on, of monitoring the individual actuating devices in order to prevent the danger of generating derailing torques as mentioned previously.

Figure 2:
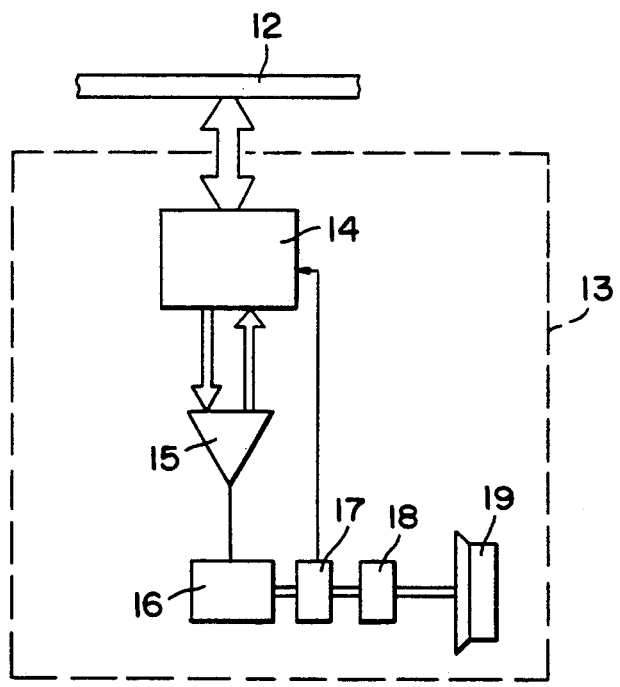
FIG. 2 shows a block diagram of an individual wheel actuator forming part of the system of FIG. 1.

As shown in FIG. 2, each individual actuator 13 is composed of a local monitoring device 14 (for example in the form of a microprocessor device) connected, for the exchange of control and information signals, to a power system 15, for example of the switching or inverter type or other suitable type, controlling an electric motor 16 whose drive shaft is connected, by means of a mechanical reduction unit 18, to a traction wheel 19. Moreover, the shaft of the motor is also kinematically connected to a tachymetric detector 17, for example a speedometer dynamo, which sends the local monitoring device 14 a feedback signal in relation to the speed of the motor. Each individual actuator 13 is assigned to continuously control the operating conditions of its own motor by carrying out the commands transmitted to it by the general monitoring device 11, for example so as to reach and maintain given torque and speed conditions. Each individual device 13 advantageously measures the current absorbed by its motor, the working temperatures of the motor and electronic power devices associated with it in order to ensure that these values do not differ from the pre-established values. In addition to the normal functions of the system 10 applying the teachings of automatic feedback control systems to ensure stable operating conditions, the system innovatively carries out further monitoring functions, as shown schematically in FIGS. 3 and 4, designed to prevent the danger of generating derailing torques, as mentioned previously.

Figure 3:
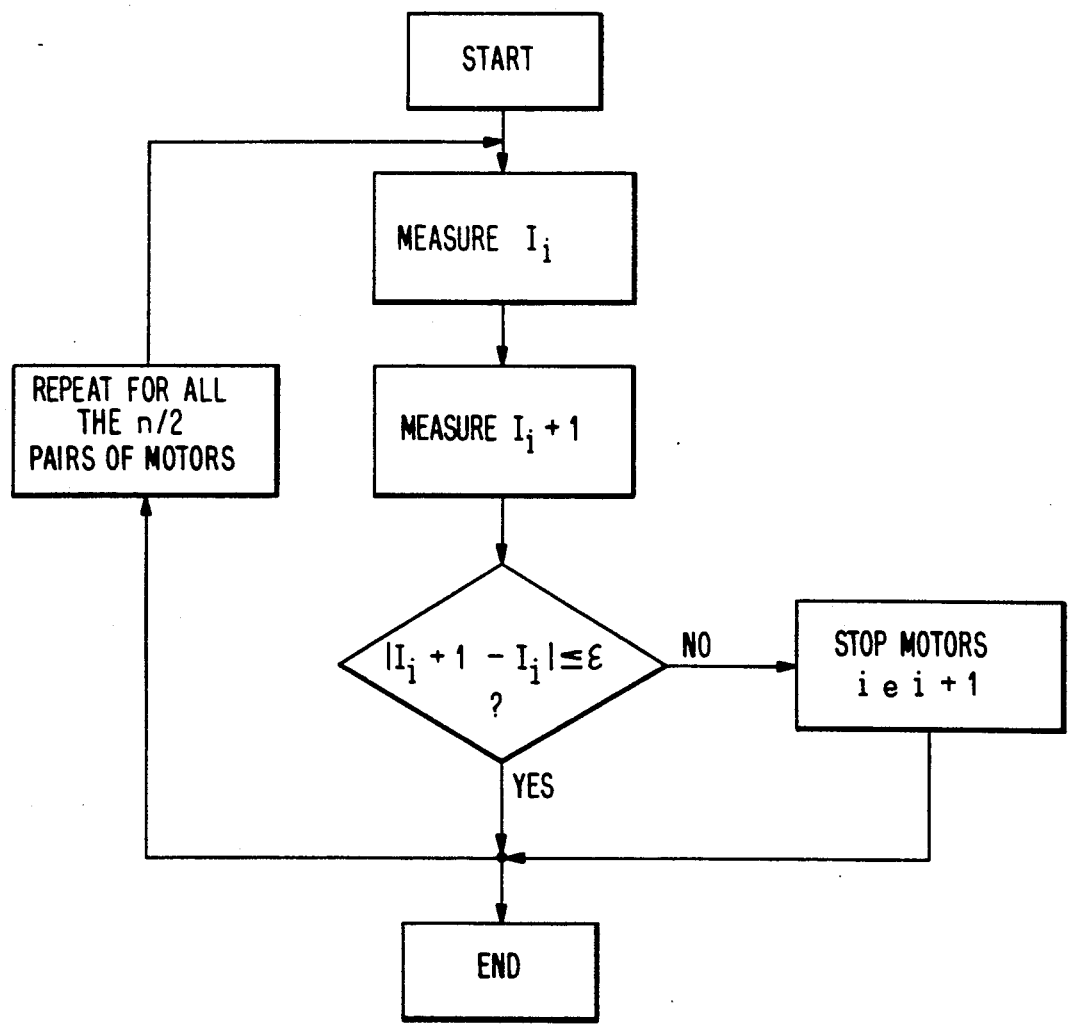
FIG. 3 shows a first innovatory operating diagram of the system of FIG. 1.

In fact, in addition to the normal monitoring functions aimed at maintaining given torque and speed conditions, by means of information and signals exchanged with the individual actuating devices 13, the general monitoring device 11, also by means of the individual actuating devices 13, cyclically measures the instantaneous currents absorbed by each individual motor indicating the torque provided at that moment, whether it be a tractive or a regenerative braking torque. As shown in FIG. 3, each time it measures the current $I_i$ absorbed by one motor i-th and the current $I_{i+1}$ absorbed by the corresponding motor $(i+1)$-th, with the motor $(i+1)$-th indicating the motor of the corresponding wheel on the other side of the vehicle opposite the wheel served by the motor i-th, the general monitoring device calculates whether the difference $I_i - I_{i+1}$ is lower in modulus than a given quantity $\epsilon$ pre-established as the maximum difference acceptable as generating a negligible derailing torque.

If the difference exceeds said value $\epsilon$, the general monitoring device sends a signal to switch off the power supply to the two motors, i-th and $(i+1)$-th respectively, thereby preventing the danger of creating hazardous derailing torques. In fact, a difference in the currents absorbed by two motors controlling opposing wheels indicates a difference in torque and, consequently, the danger of derailment. A difference of this kind can primarily be due to faulty operation of one of the two motors of the pair, either because the power supply to it is cut off causing it to run free, or because it is supplied with uncontrolled power, for example, maximum power. A complete shutdown of the motor subjected to failure and a simultaneous shutdown of the complementary actuator on the other side rebalances the forces with respect to the axis of rotation of the bogie, reducing the resultant of the torques applied to it to a substantially zero value. The decrease in overall torque transmitted between the wheels and the rails due to the shutdown of two motors can to a certain degree be absorbed by the other still efficient motors and does not deteriorate the performance of the vehicle or at least keeps it within acceptable limits. Although an operation such as the one described above effectively prevents the danger of derailment, this invention, according to a further innovatory principle, comprises further devices to assure against such dangers. In fact, as already mentioned previously, if a vehicle with independently driven wheels is travelling at a constant speed, any failures capable of preventing the possibility of varying the speed of rotation of the motor in question may remain unnoticed, and the motor will continue to rotate at the speed previously set. In order to avoid such hazardous situations and detect in good time any failures which endanger the possibility of varying the speed of rotation of the motor, for example a short circuit in the power devices supplying the motor with a controlled input voltage, this invention comprises a second innovatory control mechanism, schematically illustrated in FIG. 4.

Figure 4:
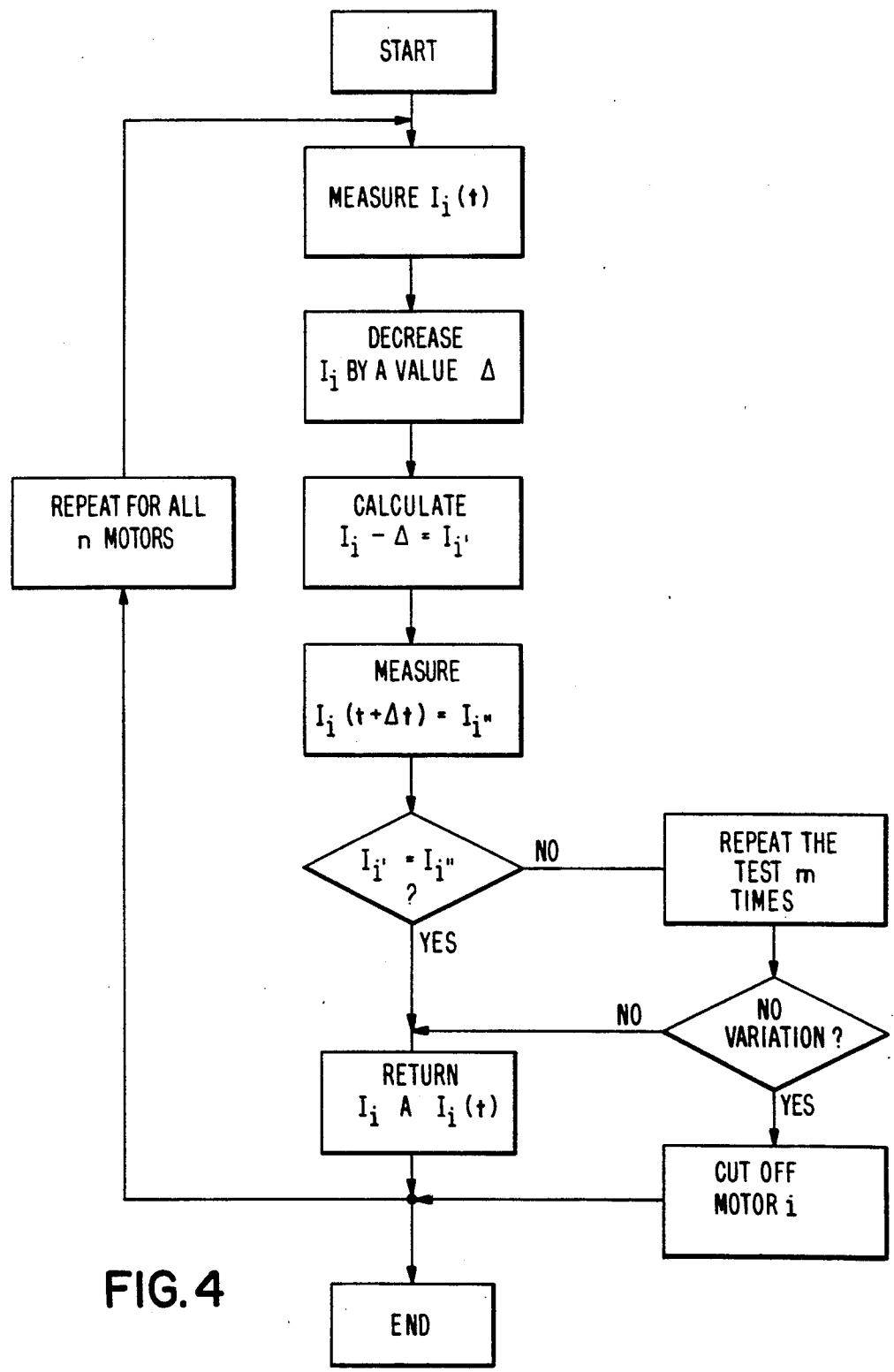
FIG. 4 shows a second innovatory operating diagram of the system of FIG. 1.

As can be seen in this figure, the general monitoring device cyclically makes small test variations in the quantities commanded by each actuator and if it detects a failure to carry out the variation it deactivates the corresponding motor while the mechanism previously described with reference to FIG. 3 immediately deactivates the complementary motor thereby preventing the generation of derailing forces (or, alternatively, both the motor out of control and its complementary motor can be shut down directly by the control device of FIG. 3). For example, as shown in FIG. 4, after having detected the current Ii being supplied to a respective motor 16, the monitoring system sends a signal to the associated actuator 13 to decrease the current flowing through the motor by a given value, calculates the value Ii that the current in the motor should have reached as a result of the command, measures the effective current Ii(tt) flowing through the motor after the command to vary it and compares the calculated value Ii with the effective value Ii(tt). If it is equal (possibly, less by a small quantity $\tau$ taking into account for example possible measurement errors) it confirms that the actuator is operating properly. The monitoring device consequently returns the value of the current in the motor to the original value Ii and proceeds to check the next actuator. If it is not equal (or if the difference is greater than said value $\tau$) it means that the actuator has not carried out the command. For even greater safety, the monitoring device repeats the test an "m" number of times and if the variation is still not made, it completely cuts off the power supply to the motor of the actuator being tested.

The aforementioned testing cycle is repeated cyclically on all the "n" motors in sequence.

The frequency of the test variations must obviously be kept at a sufficiently high level so as not to be felt by the mechanical system, which is affected by relatively high time constants. It will be clear from the foregoing description that the scopes of this invention have been achieved. Any possibility of derailing torques being generated by defects in a traction system with separate motors for each traction wheel is eliminated by the innovatory device proposed herein. The electric and electronic circuits of a monitoring system according to the invention are not described in detail since they are easily imaginable by any expert technician, especially in the light of the foregoing description.

It has been found advantageous to make use of optic fibres for transmitting remote control signals between the local and general monitoring devices so as to obtain immunity to electromagnetic interference, which is always considerable in the type of application described, thus ensuring highly reliable operating conditions within constant safety standards.

The foregoing description of an embodiment applying the innovatory principles of this invention is obviously given by way of example in order to illustrate such innovatory principles and should not therefore be understood as a limitation to the sphere of the invention claimed herein. For example, the quantity under control to determine the torque of each individual motor can differ from the current absorbed. Likewise, in order to check the functioning of each individual actuator, it is possible to carry out a variation test on another controlled quantity other than the current flowing through the motors, for example the voltage applied to them or another of the quantities measurable by the particular type of actuator used. Lastly, the motors can either be of the type operating on direct current or of the type operating on alternating current, with the obvious modifications to the power system 15 in the two cases, as is easily imaginable by any technician.

I claim:

1. A method for monitoring a railway vehicle traction system utilizing monitoring means controlled by an automatic drive system for controlling and coordinating a supply of electrical power to the drive motor of each of a plurality of individually driven wheels disposed in opposing coaxial pairs on either side of the vehicle, characterized by the steps of cyclically measuring, for each motor of a respective pair of said wheels, a representative quantity of the mechanical torque developed by said motor at a given moment, comparing the representative quantities of torque thus measured for the two motors of each coaxial pair of wheels, and disconnecting both motors of a respective pair of said wheels from the electric power supply whenever the result of the comparison shows a difference greater than a previously established value.

2. Method as claimed in claim 1, characterized by the further steps of cyclically memorizing the temporary value of a parameter of each motor controlled by said monitoring means of the motors, commanding a variation of said temporary value of such parameter of said motor by a small pre-established quantity, calculating the value that such controlled parameter should reach as a result of such variation, comparing the result of the calculation with said memorized value, and switching off the power supply to said motor whenever the result of such comparison is not equal to or less than a pre-established quantity.

3. Method as claimed in claim 2, characterized by the further step of switching off the power supply to the other motor of the pair thereof, in a respective event of inequality in said comparison.

4. Method as claimed in claim 1, characterized by the fact that the quantity considered as representative of the mechanical torque of the motor is the current absorbed thereby.

5. Method as claimed in claim 2, characterized by the fact that said parameter is the current absorbed by the motor.

6. Railway vehicle traction system comprising monitoring means forming part of an automatic drive system for controlling and coordinating a supply of electrical power to the drive motor of each of a plurality of individually driven wheels disposed in opposing coaxial pairs on either side of the vehicle, said monitoring means comprising means for measuring, for each motor of a respective pair of said wheels, a representative quantity of the mechanical torque developed by said motor at a given moment, first means for comparing the representative quantities of torque as measured by the measuring means for the two motors of a respective pair of said wheels, said first comparing means controlling switching means for switching off the power supply to both motors of a respective pair of wheels whenever the result of the comparison of said representative quantities shows a difference greater than a previously established value.

7. System as claimed in claim 6, characterized by means in combination with each motor and activated in cyclic sequence, comprising a plurality of sensors for detecting a temporary value of a parameter of each motor, controlled by the means monitoring the motors, means for memorizing the value measured by said sensors, means for automatically commanding the variation of such parameter by a small pre-established quantity, means for calculating the value that said controlled parameter should reach as a result of such variation, second means for comparing the result of the calculation with the effective value reached and measured again by said sensors, said second comparing means actuating switching means for switching off the power supply to a respective motor whenever the result of the comparison associated therewith is not equal to or less than a pre-established quantity.

8. System as claimed in claim 7, characterized by the fact that said second comparing means simultaneously actuates said switching means for switching off the power supply to the other motor of a respective pair thereof.

9. System as claimed in claim 6, characterized by the fact that the means for measuring the quantity considered as representative of the mechanical torque of a respective motor comprises means for measuring the current absorbed by said motor.

10. System as claimed in claim 7, characterized by the fact that the sensors detecting the controlled parameter are sensors which detect the current absorbed by a respective motor.

11. System as claimed in claim 6, characterized by the fact that the monitoring means comprise, for each wheel of said plurality, an actuating device comprising said measuring means and a power device connected to the corresponding motor to supply it with controlled power in order to control the mechanical torque and the speed of rotation of the motor, the monitoring means also comprising a general monitoring device connected to the actuating devices by means of control and signal communication lines, the general monitoring device comprising said first comparing means.

12. System as claimed in claim 11, characterized by the fact that general monitoring device also comprises the automatic varying means, the calculating means and the second comparing means.

13. System as claimed in claim 11, characterized by the fact that the communication lines are achieved by means of optical fibre links.

14. System as claimed in claim 11, characterized by the fact that the general monitoring device is made in the form of a first microprocessor system.

15. System as claimed in claim 11, characterized by the fact that each actuating device is made in the form of a second microprocessor system.

16. System as claimed in claim 11, characterized by the fact that each actuating device comprises a local monitoring device connected for the exchange of control and information signals between said lines and said power system connected to the corresponding motor, the shaft of the motor being kinematically connected to a tachymetric detector which sends the local monitoring device a feedback signal in relation to the speed of the motor.

* * * * *